No. 880,117. PATENTED FEB. 25, 1908.
C. H. BALL & J. F. ROGERS.
COMPENSATING MECHANISM FOR AUTOMOBILES.
APPLICATION FILED APR. 6, 1906.
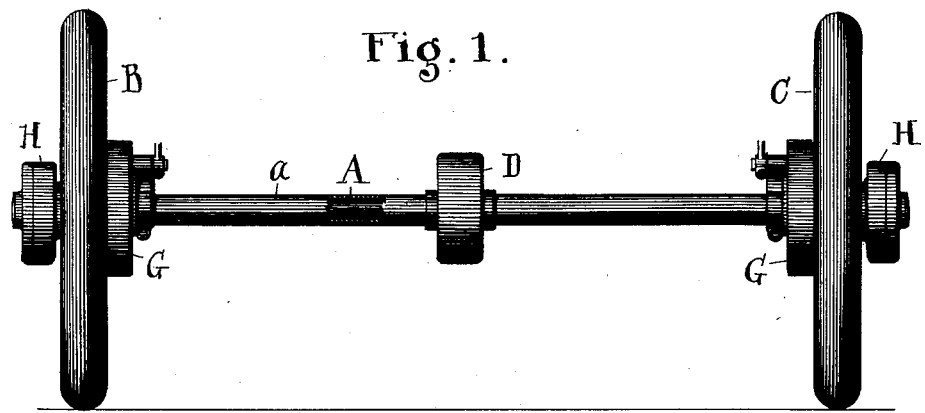
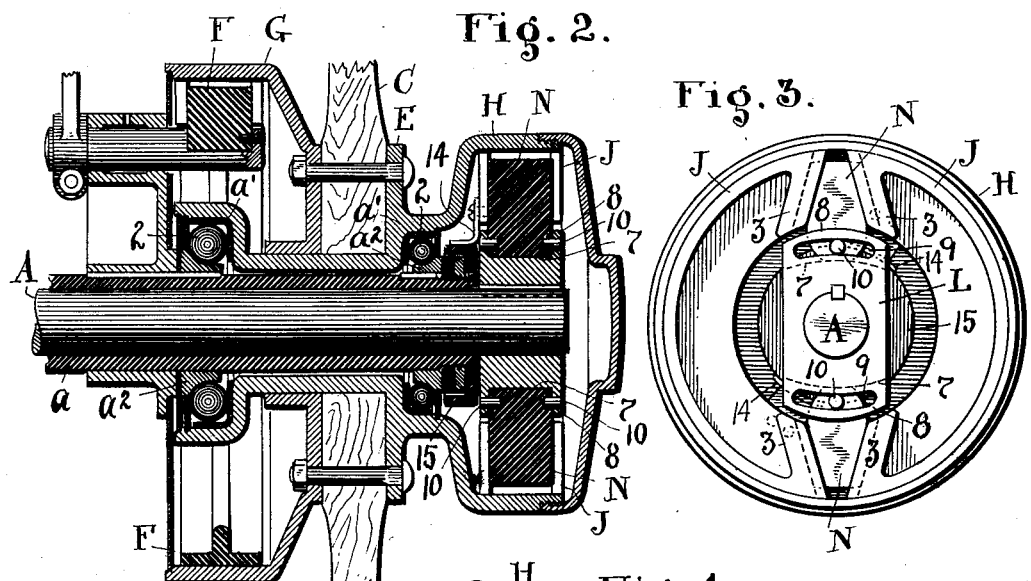
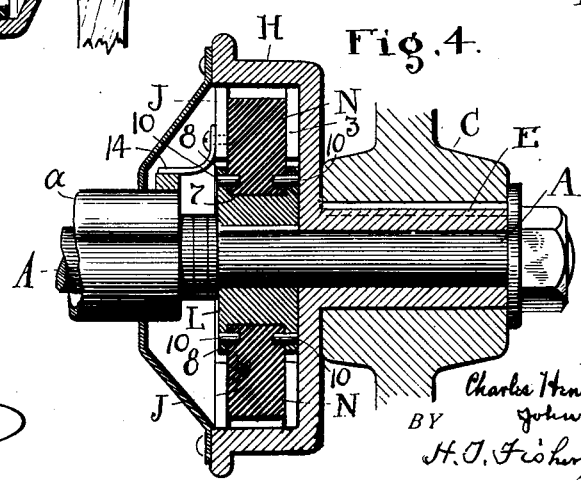
WITNESSES:
INVENTORS.
Charles Henry Ball
John Frank Rogers
BY
H. J. Fisher
ATTORNEY.

UNITED STATES PATENT OFFICE.

CHARLES HENRY BALL AND JOHN FRANK ROGERS, OF CLEVELAND, OHIO.

COMPENSATING MECHANISM FOR AUTOMOBILES.

No. 880,117.　　　　Specification of Letters Patent.　　　　Patented Feb. 25, 1908.

Application filed April 6, 1906. Serial No. 310,297.

*To all whom it may concern:*

Be it known that we, CHARLES HENRY BALL and JOHN FRANK ROGERS, citizens of the United States, residing at Cleveland, in the county of Cuyahoga and State of Ohio, have invented certain new and useful Improvements in Compensating Mechanism for Automobiles; and we do declare that the following is a full, clear, and exact description of the invention, which will enable others skilled in the art to which it appertains to make and use the same.

This invention relates to compensating mechanism for automobiles and like vehicles which carry their own power and apply the same through one or the other axle, usually the rear axle, and the invention consists in means connected with the drive axle adapted to prevent slipping of the drive wheel when turning a corner and to permit the other wheel on said axle to automatically disengage itself from driving connection and rotate independently thereof on its own radius until the turn is completed, all substantially as shown and described and particularly pointed out in the claims.

In the accompanying drawings Figure 1 is a plain elevation of a vehicle axle and wheels thereon equipped with our invention, and Fig. 2 is an enlarged sectional elevation on the line of the axle of one of the wheels, as hereinafter fully described. Fig. 3 is a view of the outside of the compensating mechanism as such with the cap that covers the same in Fig. 2 removed and looking directly in line with the axle. Fig. 4 is a sectional elevation of a modification of the invention, showing a type of construction and arrangement of parts in which the wheel is outside the compensating mechanism and the reverse of Fig. 2.

In the several views A represents the rear or drive axle of a vehicle, say an automobile, and B and C are the wheels thereon as seen in Fig. 1.

D is the driving gear casing.

E represents the hubs of the wheels, both being alike, and this part or hub is mounted on the axle, or over fixed sleeve $a$ thereon by antifriction balls 2 confined in shouldered races $a'$ at the ends of the hub, Fig. 2, and bearing upon suitable rings $a^2$ on sleeve $a$ and which parts are fixed while the wheel turns thereon in unison with the turning of shaft A under normal conditions, and a friction brake band F, engages a friction rim G fixed to the hub and spokes of the wheel as shown in Fig. 2, or in any suitable manner.

H represents a friction hood or rim which is shown as rigid or integral with the hub proper of the wheel, Fig. 2, and stands outwardly therefrom over and apart from the end of the axle and constitutes the wheel member of the compensating mechanism above referred to. Said hood or rim is circular and has a smooth inner working surface straight in cross section and adapted to be frictionally engaged by the segments J. These segments have each an inclined inward projection 3 at each end, and said projections are flared from each other at corresponding ends of the segments so as to provide substantially wedge shaped spaces between them. Wedges N are set into these spaces from the inside and are confined between said projections 3 by suitable flanges at the edges of the projections and have their base or larger portions or ends bearing upon the curved ends 7 of cam L, which is splined or otherwise firmly fixed upon the extremity of shaft A. Side flanges 8 on the ends of said cam confine said wedges laterally and are provided with curved slots 9 concentric with the end bearing faces 7 for the said wedges and are each engaged by a pin 10 at the middle and side of the wedge. The cam edges 7 being eccentric to axle A, it occurs when the axle is turned and cam L with it the said edges 7 exercise a cam action or effect at both ends and thrust wedges N outward, thus spreading friction segments J outward into engagement with hood or rim H and locking the same frictionally in contact with said ring. As this occurs wheel C is engaged and caused to rotate with the axle the same as if they were rigidly connected, and the said parts turn in fixed sleeve $a$, which is rigid with the frame work of the vehicle as above described.

Assuming now that both wheels on axle A are engaged simultaneously by the compensating mechanism for each as just described, and that both travel together at the same speed in a direct line, if a corner is to be turned the wheels will either have to change their relative speed or the inner one will have to slip or slide to conform its rotation to the faster rate of the outer wheel which travels on the larger radius. This would be a strained and objectionable condition, for obvious reasons, and hence the compensating mechanism herein provided to meet such conditions and which automatically releases the outer wheel and holds the power on the inner wheel till normal or direct travel is again resumed. Such release of the outer wheel occurs initially the moment the turning of the corner begins and the outer wheel increases its speed, because by this action it runs ahead of the speed of the axle and releases itself from the grip of the wedges and engaging segments induced by the axle. Then the said wedges and segments automatically resume a neutral position, or say about as seen in Fig. 3, in which position these parts are out of clutch engagement with the wheel. It will of course be understood that frictional clutching through segments J is possible only from within outward, and as the wheel and axle are going in the same direction with the wheel at the greater speed, a driving engagement of the parts cannot again occur until the axle overtakes the wheel. Incident to this released and independent running of the wheel is the device shown for frictionally retarding segments J in their rotary movement relative to axle A and during the interval of movement of wedges N. This device comprises a spring 14 fixed to each segment at its inner side and bearing upon a ring 15 threaded upon the corresponding end of sleeve *a*, and this bearing is of such strength that it retards the rotary movement of the segments relatively to the movement of the shaft. In this relation wheel C can run ahead of the axle with perfect freedom and engagement therewith will not be resumed until the wheel slows to the speed of the axle, when such renewed engagement will be automatic as before.

Fig. 4 illustrates substantially the same parts as Fig. 2, but in reverse or transposed relation on the axle. Otherwise there is no material difference. Rim H may be located centrally within the wheel or wheel hub in place of being at one side thereof as shown.

What we claim is:—

1. A compensating mechanism for vehicles, comprising a driven axle, a wheel mounted to turn independently on the axle, and mechanism to positively engage the wheel with the axle comprising segments and a cam and wedges to force the segments into locking engagement with the wheel.

2. A compensating mechanism comprising a driven axle, a wheel mounted on the axle, a cam fixed on said axle and a rim on said wheel, and wedges and friction segments interposed between said cam and rim to operatively engage the wheel with the axle.

3. Means to drive an independently mounted wheel comprising an axle carrying said wheel, a cam on the axle and wedges adapted to be actuated thereby, segments having their ends in working contact with said wedges and a rim on said wheel adapted to be frictionally engaged by said segments about their outer surfaces.

4. The axle of a vehicle and a wheel mounted to turn independently thereon, and means to automatically lock and unlock the wheel operatively as to said axle comprising a rim rigid with the wheel at one side thereof, a double faced cam fixed on said axle, wedges mechanically connected with said cam so as to both force the wedges outward and draw them back, and segments having inclined edges engaged by said wedges and adapted to frictionally engage said rim.

5. A vehicle axle, and a wheel independently mounted over the same, and having a lateral rim at one side thereof with an inner engaging surface, in combination with means to lock and unlock said wheel in respect to the axle, comprising a pair of segments with oppositely inclined projections at corresponding ends, wedges between said projections and a double faced cam on said axle bearing against the said wedges, said cam and wedges constructed to cause said wedges to move both outwardly and inwardly according as the wheel travels with the axle or at a greater relative speed.

6. In vehicles, means to operatively lock together an independently rotatable wheel and a power driven axle and to automatically release the wheel from the power of the axle when its rate of travel is greater than that of the axle, said mechanism comprising a cam and wedges actuated thereby and means operated by the axle to reverse the wedges.

7. A vehicle axle and a wheel independently mounted thereon, in combination with means to lock said parts together and to automatically unlock them comprising a cam on the axle and a rim on the wheel about the same, segments within said rim and wedges engaged by the cam and extending between said segments, said cam having transverse slots engaged by lugs on said wedges, and a friction device for said segments.

8. The construction substantially as described, comprising the axle with the double cam thereon, and the wheel and the rim on the side thereof, in combination with the wedges operatively connected with the cam at their base and friction clutch segments disposed within said rim having inwardly inclined end projections between which said wedges are laterally confined, and said cam and wedges constructed and connected to withdraw the wedges when the lowest points of the cam is reached.

In testimony whereof we sign this specification in the presence of two witnesses.

CHARLES HENRY BALL.
JOHN FRANK ROGERS.

Witnesses:
R. B. MOSER,
C. A. SELL.